United States Patent [19]

Kutsch et al.

[11] Patent Number: 4,545,291
[45] Date of Patent: Oct. 8, 1985

[54] ROOFLINE VENTILATORS

[75] Inventors: Harold G. Kutsch; Earl A. Ehrlich, both of Dubuque, Iowa

[73] Assignee: Klauer Manufacturing Company, Dubuque, Iowa

[21] Appl. No.: 587,503

[22] Filed: Mar. 8, 1984

[51] Int. Cl.$^4$ .............................................. F24F 7/00
[52] U.S. Cl. .................................. 98/42.21; 98/121.1
[58] Field of Search ................... 98/42 A, 83, 121 R; 52/199

[56] References Cited

U.S. PATENT DOCUMENTS 3,185,070  5/1965  Smith .................................. 98/42 A
3,213,776 10/1965  Adams ................................ 98/42 A
4,000,688  1/1977  Malott ................................ 98/42 A

FOREIGN PATENT DOCUMENTS 0150262  9/1920  United Kingdom ............... 98/42 A Primary Examiner—William E. Wayner
Assistant Examiner—John Sollecito
Attorney, Agent, or Firm—Larson and Taylor

[57] ABSTRACT

A ventilator for farm barns which is constructed to be positioned over an elongated opening along the ridge of the barn roof. The ventilator is comprised of sheet metal and has inner baffle and flue portions and an outer storm band casing which is about twice as wide as it is high. The baffle portion is in the form of an isosceles triangle the side walls of which extend laterally beyond the width of the flue portion. Rows of louvers in the base of the baffle portion and in the side walls of the flue portion open downwardly and outwardly while those in the base of the baffle portion are directed inwardly. The top of the storm band has louvers therein opening toward the ridge line. The structure provides a simple, effective, weatherproof ventilator.

7 Claims, 5 Drawing Figures

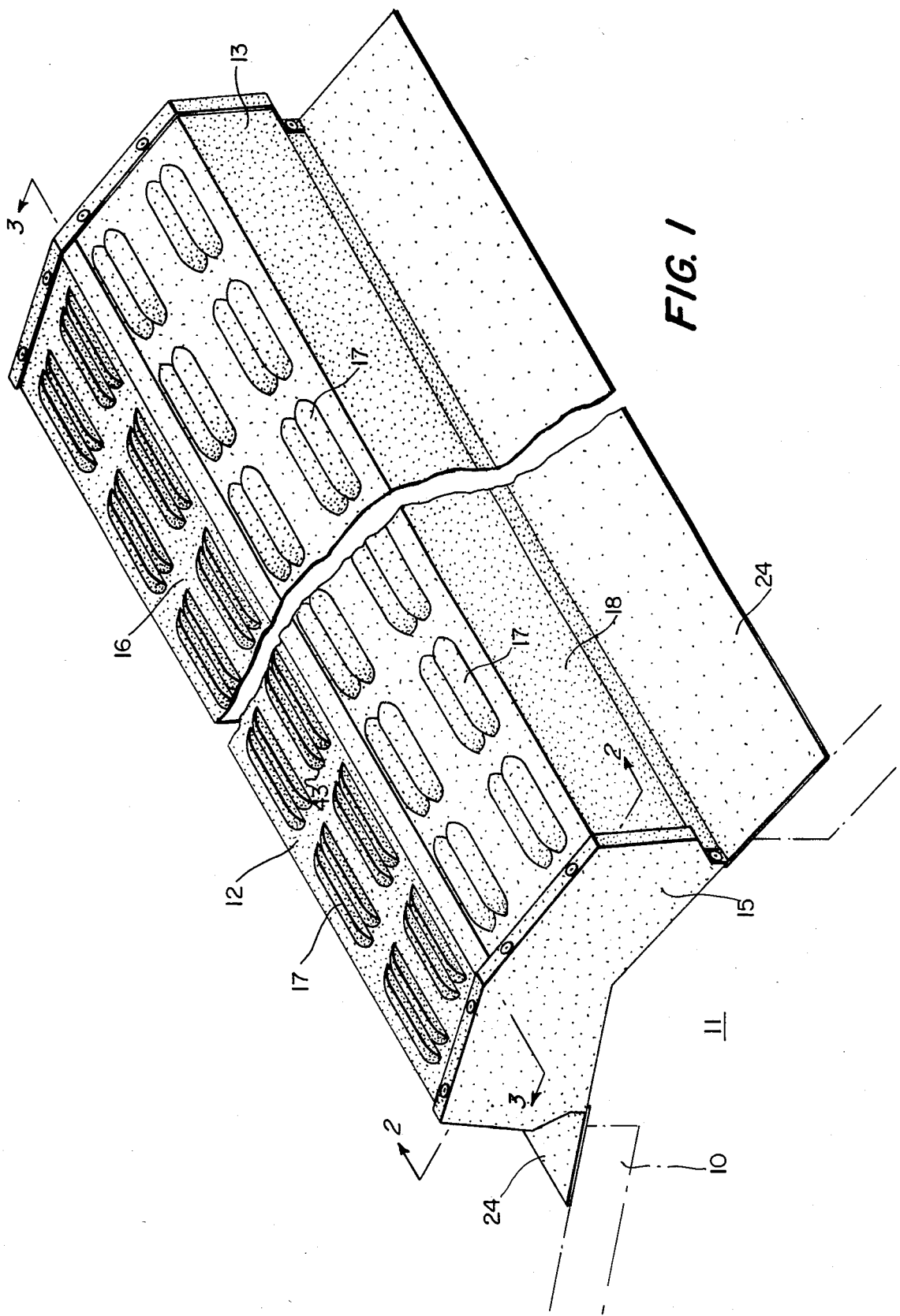

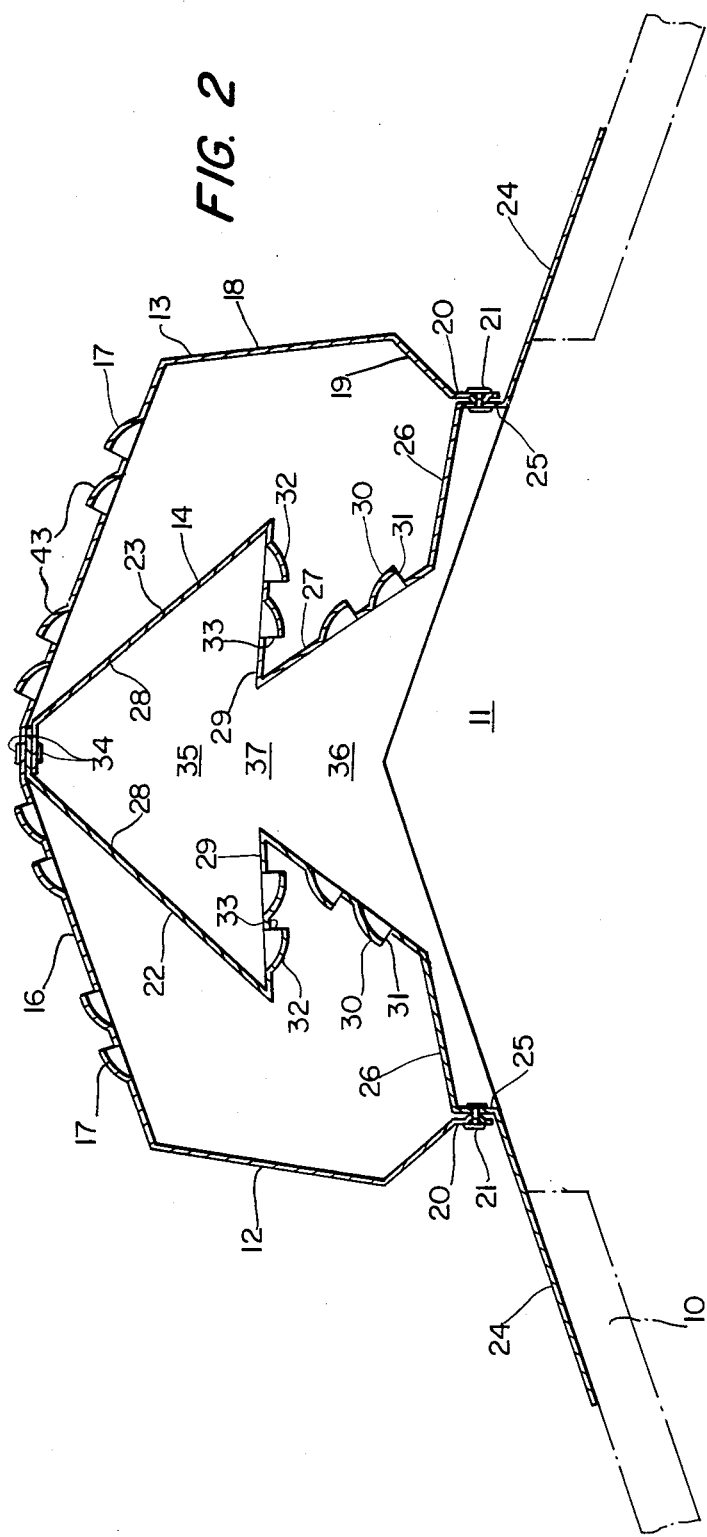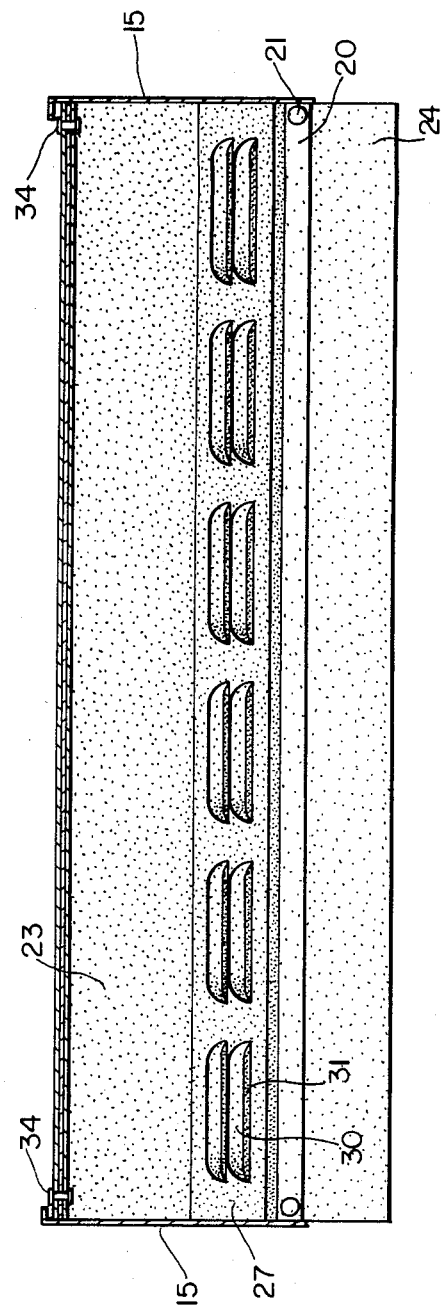

ROOFLINE VENTILATORS

BACKGROUND OF THE INVENTION

This invention relates to building ventilators and more particularly ridge ventilators of the type in which an elongated ventilator structure is mounted over an elongated opening in the roof of the building along the ridge line. Many different kinds of such ventilators are known and used in industry. Some are the stationary type relying entirely on the prevailing breezes and the higher temperature of the air or fumes to be evacuated to create negative pressure within the ventilator and to provide the forces necessary to effect the exhaust. Others are provided with auxilliary means such as electric fans or blowers to assist in the exhaust process.

Ridge ventilators of these general types have long been known. See for example the ventilators illustrated and described in U.S. Pat. Nos. 2,232,027; 2,410,950; 3,213,770; and British Pat. No. 865,730. These and U.S. Pat. No. 2,232,027 which was assigned to the present assignee company disclose ridge ventilators which rely on air movement to provide the power. The ventilators have several disadvantages when used on certain types of buildings. Most of them are open at the top and to prevent rain, snow and sleet from entering the building they are provided with damper means to be operated, usually manually, to block the roof opening. Obviously, no ventilation can take place during such periods.

The ridge ventilator of U.S. Pat. No. 2,232,027 has a large rectangular opening at the top protected only by a bird proof screen, and can, during a heavy snow, become partially clogged, at least to the point of interfering with the operation of the adjustable movable damper used for controlling the ventilation. Moreover, such a ventilator is of somewhat complicated construction which renders it more difficult to build and to assemble on the building.

In the building ventilator art, little attention has been given to providing a simple and effective ridge ventilator for agricultural barns and other farm buildings. The present invention is particularly suitable for such buildings and should prove beneficial to the Post Frame Industry for that reason. For those not familiar with such terms, it may be explained that originally, at least in this country, cattle and horse barns were simply constructed of poles or upright timbers sunk into the ground, and provided with sidings and a roof. In more modern times the pole timbers have been squared and finished before use. The industry which provides such has come to be known as the Post Frame Industry.

Sometimes such farm barns have been provided with a single cupola ventilator perched in the middle of the barn roof at the ridge. Such cupola ventilators however have not proved adequate, particularly for barn structures which are provided with a loft for storing grain, hay or the like. Moreover, in such structures it is highly desirable to ventilate the loft areas particularly under the eaves of the roof in order to keep the material being stored and also the insulation dry. For such structures it is not essential, nor is it desirous for the ventilator to be provided with auxilliary means such as fans to assist in the exhaust process. But it is important that a reasonable amount of negative pressure be developed and that the exhaust action extend substantially from one end of the roof to the other.

It has been desirous for some years to provide a stationary ridge ventilator for barn structures and the like which, while overcoming these disadvantages, at the same time is efficient and quiet in operation (with no wind rattling) and which is easy to manufacture and easy to assemble and erect on a roof even for inexperienced workmen. Moreover, such ventilators should be entirely weatherproof and clog-proof and of low streamline, cleanline, appearance and operable under all conditions without the necessity of additional fans or other exhaust means. It is a general object of this invention to provide such a ventilator.

BRIEF DESCRIPTION OF THE DRAWINGS

Other objects of the invention will become apparent from the following description and accompanying drawings in which:

FIG. 1 is a perspective view of a roof ventilator embodying a preferred form of the invention;

FIG. 2 is a cross-sectional view taken on the line 2—2 of FIG. 1;

FIG. 3 is a side elevation view of the interior baffle and flue structure;

DETAILED DESCRIPTION OF THE PREFERRED EMBODIMENTS

Figure 4:
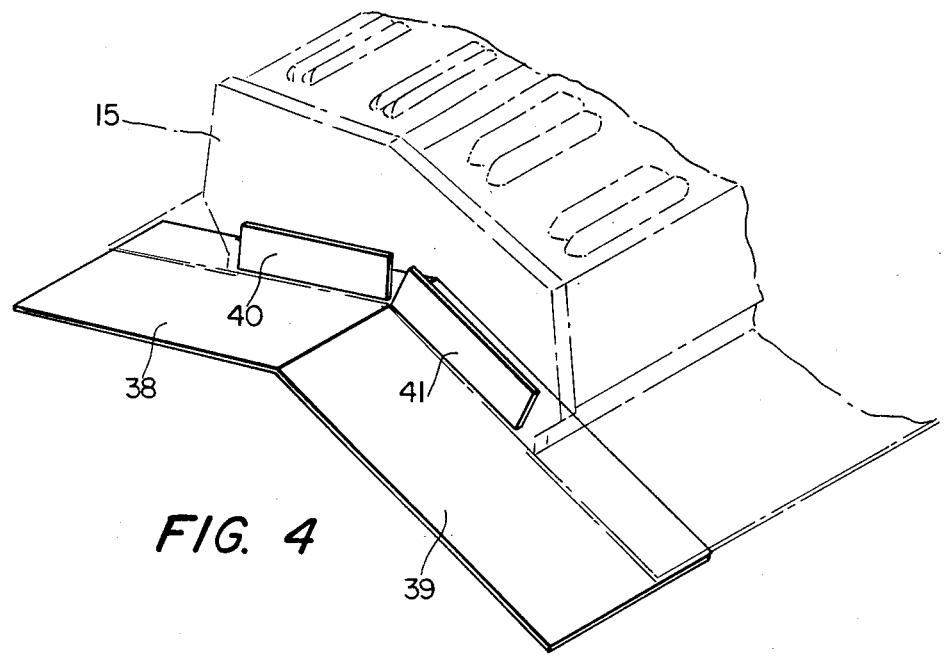
FIG. 4 is a partial perspective view showing a flashing of the type used at each end of the ventilator.

Referring to FIG. 1, a typical building having a pitched roof 10 provided with an elongated rectangular opening 11 formed at the ridge of the building the opening being covered and protected from the weather by a ridge ventilator 12 constructed in accordance with a preferred form of the invention.

The ventilator 12 may be constructed entirely of sheet metal and is comprised principally of an outer casing member 13, an inner baffle and flue member 14 (see FIGS. 2 and 3) and end caps 15. We have found that a prepainted hot dipped galvanized steel employed in some ridge ventilators is very well suited for a ridge ventilator as herein illustrated and described.

The outer casing member 13 constitutes an elongated chamber which has a length and width slightly greater than that of the roof opening 11. It has a top 16 which slopes downwardly from the longitudinal center ridge line and which is provided with rows of eduction louvres 17. Integral side walls 18 slope outwardly from the vertical, then inwardly as 19 and then vertically downwards as 20 for a short distance. Rivets 21 are employed to secure the casing member 13 to the inner supporting baffle member 14.

The inner baffle member 14 extends the length of the outer casing member 13 and is disposed therein. It consists of two elongated sheet metal wall members 22 and 23. As will be seen in the cross-sectional view (FIG. 2) each consists of a flashing portion 24 adapted to be secured to the building roof, one on each side of the building roof opening 11, a short vertical position 25 to which the casing member 13 is secured by the rivets 21. Each of the sheet metal wall members 22, 23 then slopes inwardly as at 26. Each then has two inwardly and upwardly sloping portions 27 and 28, with intermediate horizontal portion 29. Each sloping portion 27 is provided with parallel rows of louvres 30 which at their lower edges are open to form exhaust parts 31. Each intermediate horizontal portion 29 is also provided with rows of louvres 32 which open inwardly as at 33. These louvres may be formed by a stamping operation. At those points where the inner baffle and flue structure and the center casing are secured by the rivets 21, the short vertical portion 20 is bent inwardly by stamping to provide a vertical drainage space between the short vertical walls 20 and 25.

The upwardly sloping portions 28 are secured by rivets 34 to each other at their upper edges and to the outer casing member 13 of the ventilator 12 along the apex ridge line.

It will be seen (again from FIG. 2, cross-sectional view) that when assembled the two sheets 22, 23 which make up the baffle member 14, form spaces 35 and 36 which in the cross-sectional view comprise an isoceles triangle above a truncated one with the space 35 of the upper one having a central opening 37 which connects with the upper open end 36 of the truncated one. The space 36 formed by the iscoceles triangle structure constitutes a flue portion which communicates through opening 37 with the space 35.

FIG. 4 illustrates end flashing members 38 and 39 which when assembled have portions 40, 41 which respectively bear against the building roof and the end caps 15.

Figure 5:
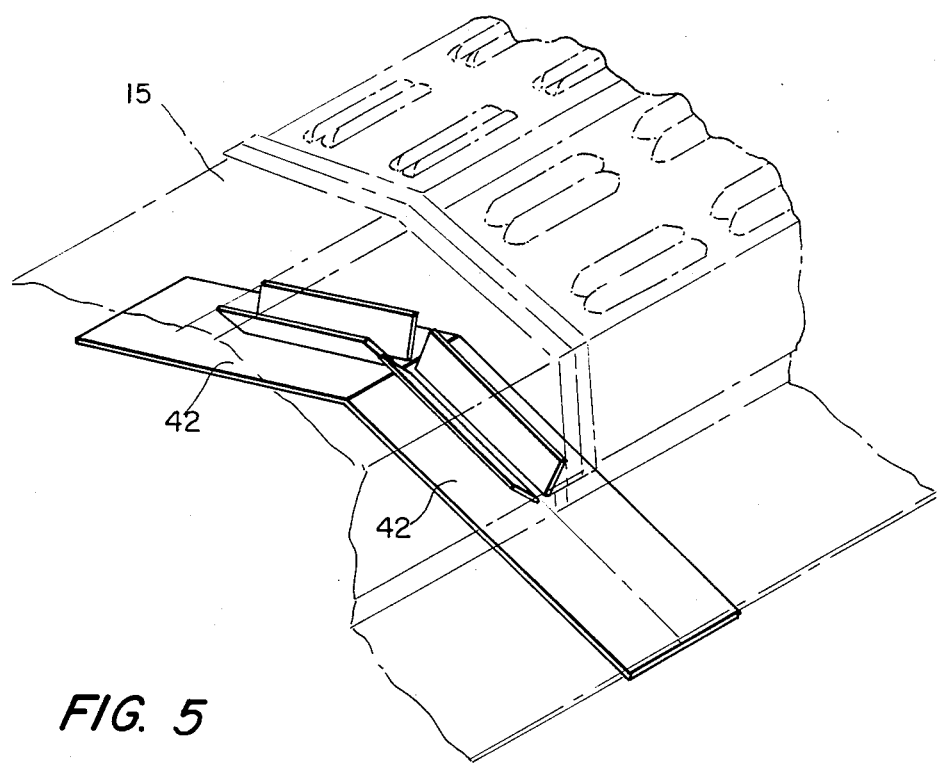
FIG. 5 is a partial perspective view of a connecting flashing used to connected adjoining sections of the ventilator so as to enable two or more sections to be added where a ventilator of greater length is desired.

The ventilator can be cut transversely where desired and any desired length of ventilator can be provided by joining two or more lengths together in tandem by using connecting flashing 42 as illustrated in FIG. 5.

While the cross section of the rows of louvres 17 is well illustrated in FIG. 2, their arrangement in rows is best shown in FIG. 1 which illustrates the manner in which the louvres 17 are arranged on top 16 of the outer casing member 13. FIG. 3 shows perhaps best the arrangement in rows of the louvres 30 on the sloping portions 27, of the member 14 and the louvres 32 in the horizontal member 29.

As can be seen from the drawings these louvres are stamped from the flat surfaces of the sheet metal so that the faces of the openings 33 are substantially perpendicular to the surfaces from which the louvres are stamped while the hooded or cowl portions 32 have a gently rounded configuration. With respect to FIGS. 1 and 2 it will be noted further that the louvres 17 on the top 16 of the outer casing member 13 are arranged so that the openings in the louvres on each side face toward the longitudinal ridge line of top 16. The rounded hood portions 43 of the louvres 17 are thus positioned so that any breezes travelling in the direction of the ridge line would pass over the louvres, contribute to the buildup of a negative pressure within the baffle member 14 thus effectively aiding the exhaust of fumes and gases from the building being ventilated.

The arrows in FIG. 2 illustrate this. These arrows indicate the path of the fumes or gases through the opening 11 in the roof through the flue portion and into the spaces 35 and 36, from which the gases exit through the louvres 30 and 32. While these louvres 30 and 32 permit the exit of the gases from the space 35, 36 into the outer casing member 13 from which they exit through the rows of louvres 17 on the top of 16. It will be noted that the configuration and arrangement is such as to prevent rain, snow or sleet from reaching the building roof opening 11 and entering the interior of the building. The wall 22, 23 of the baffle member 14 direct any such rain or the like laterally outwardly to a position where it cannot possibly enter the openings in the rows of louvres 30 and 32, not only because of their location but also because of the rounded hood portions 43 of the louvres which act to prevent any entrance through these louvre openings. What little rain finds it way into the space between the inner baffle and flue structure and the outer casing simply is drained off to the roof through the space between the short vertical wall portion 20 and 25.

As described and illustrated the ridge ventilator is not only weatherproof but presents a clean line appearance. Trials have shown that the aerodynamic design produces a good negative pressure at the point of ventilation. No additional mechanisms such as exhaust fans or the like are required.

As indicated several sections of the ventilator can be joined together by the use of the connecting flashing 42. The flashing 24 for the roof pitch is adjustable for various angles of roof pitches. There are no movable parts such as dampers or fans. These are found to be unnecessary and their absence contributes greatly to the ease of manufacture and assembly. The structure is easily and rapidly installed and when assembled and when in place it comprises a very durable design. In use there is no disturbing wind rattling. It is absolutely quiet.

In order to obtain good ventilation while at the same time having a ventilator which presents a low profile, clean line, appearance, it is imporatnt that the dimensions of the various parts be in ratios comparable to those illustrated in FIG. 2. In actual practice it has been found practical to construct the ventilator in twelve foot sections with an overall height of five and one-half inches and a width of eleven and one-quarter inches. Such dimensions, it will be noted, insure a relatively short flue run for the rising heated air and fumes so that they will not drop in temperature to the point where there could be a reverse flow.

As indicated the ridge ventilator illustrated and described is a preferred form of the invention but some variations may be made therein within the scope of the invention as defined by the following claims.

We claim:

1. A ridge ventilator for farm barns comprising, an elongated flue and baffle structure adapted to be mounted over an elongated opening formed in the roof of the building at the ridge thereof, said flue and baffle structure in cross section comprising a flue portion having inwardly sloping side walls, a baffle portion in the form of an isosceles triangle in cross-section and having an elongated central opening in its base the edges of which are joined to the side walls of the flue portion, an outer storm band casing surrounding said flue and baffle structure and having a top which slopes gently laterally from its longitudinal center line, end closure caps mounted at each end of the ventilator, said caps, flue and baffle structure and outer casing being secured together to form an intregal ventilator unit, louvres formed in the base of the baffle portion and in the side walls of the flue portion, the top of the outer casing having louvres formed therein the openings therein facing the longitudinal center line.

2. A ridge ventilator for farm barns comprising, an elongated flue and baffle structure adapted to be mounted over an elongated opening formed in the roof of the building at the ridge thereof, said flue and baffle structure in cross section comprising a flue portion having inwardly sloping side walls, a baffle portion in the form of an isosceles triangle in cross-section and having an elongated central opening in its base the edges of which are joined to the side walls of the flue portion, an outer storm band casing surrounding said flue and baffle structure and having a top which slopes gently laterally from its longitudinal center line, end closure caps mounted at each end of the ventilator, said caps, flue and baffle structure and outer casing being secured together to form an intregal ventilator unit, louvres formed in the base of the baffle portion and in the side walls of the flue portion, the top of the outer casing having louvres formed therein the openings therein facing the longitudinal center line, the louvres in the base of the baffle portion opening downwardly and inwardly, and the louvres in the walls of the flue portion opening downwardly and outwardly.

3. A ridge ventilator for farm barns comprising, an elongated flue and baffle structure adapted to be mounted over an elongated opening formed in the roof of the building at the ridge thereof, said flue and baffle structure in cross section comprising a flue portion having inwardly sloping side walls, a baffle portion in the form of an isosceles triangle in cross-section and having an elongated central opening in its base the edges of which are joined to the side walls of the flue portion, an outer storm band casing surrounding said flue and baffle structure and having a top which slopes gently laterally from its longitudinal center line, end closure caps mounted at each end of the ventilator, said caps, flue and baffle structure and outer casing being secured together to form an intregal ventilator unit, louvres formed in the base of the baffle portion and in the side walls of the flue portion, the top of the outer casing having louvres formed therein the openings therein facing the longitudinal center line, the opening in the flue portion being of a width substantially equal to the height of the outer casing, and the overall width of the latter being substantially double that of the flue opening.

4. A ridge ventilator for farm barns comprising, an elongated flue and baffle structure adapted to be mounted over an elongated opening formed in the roof of the building at the ridge thereof, said flue and baffle structure in cross section comprising a flue portion having inwardly sloping wide walls, a baffle portion in the form of an isosceles triangle in cross-section and having an elongated central opening in its base the edges of which are joined to the side walls of the flue portion, an outer storm band casing surrounding said flue and baffle structure and having a top which slopes gently laterally from its longitudinal center line, end closure caps mounted at each end of the ventilator, said caps, flue and baffle structure and outer casing being secured together to form an intregal ventilator unit, louvres formed in the base of the baffle portion and in the side walls of the flue portion, the top of the outer casing having louvres formed therein the openings therein facing the longitudinal center line, the louvres in the base of the baffle portion opening downwardly and inwardly, and the louvres in the walls of the flue portion opening downwardly and outwardly, the flue portion having a height substantially half the width at its base, providing a short flue run, whereby the heated air or fumes eminating from the building will be caused to exit through and from the ventilator before it loses the rising effect of the heat therein.

5. A ridge ventilator for farm barns comprising, an elongated flue and baffle structure adapted to be mounted over an elongated opening formed in the roof of the building at the ridge thereof, said flue and baffle structure in cross section comprising a flue portion having inwardly sloping side walls, a baffle portion in the form of an isosceles triangle in cross-section and having an elongated central opening in its base the edges of which are joined to the side walls of the flue portion, an outer storm band casing surrounding said flue and baffle structure and having a top which slopes gently laterally from its longitudinal center line, end closure caps mounted at each end of the ventilator, said caps, flue and baffle structure and outer casing being secured together to form an intregal ventilator unit, louvres formed in the base of the baffle portion and in the side walls of the flue portion, to top of the outer casing having louvres formed therein the openings therein facing the longitudinal center line, the louvres in the base of the baffle portion opening downwardly and inwardly, and the louvres in the walls of the flue portion opening downwardly and outwardly, the walls of the trianglular baffle portion extending laterally to overlie the side walls of the flue portion, whereby the louvres in said side walls and in the base of the baffle portion are protected against entry of rain, sleet or the like, while still permitting air, fumes and the like from the building to pass there through and thence upwardly through the louvres in the top of the outer casing.

6. An elongated ventilator for farm barn structures and the like adapted to cover an elongated opening formed in the building roof at the ridge line, said ventilator comprising a sheet metal portion inner baffle and an integral flue portion, a sheet metal outer surrounding casing structure, and end closure caps, the inner baffle portion in cross-section being in the form of an isosceles triangle with its apex along the ridge line of the building, said baffle portion having a central opening in its base, said flue portion having outwardly and downwardly sloping walls extending from the edges of said central opening, said flue portion having lateral roof flashing, the upper edges of which are bent vertically upward for a short distance to join the downwardly sloping walls, said outer casing having a top portion which slopes gently laterally from the longitudinal ridge line for a distance beyond the width of the triangle portion of the baffle portion, the side walls of said outer casing slanting outwardly and downwardly and then inwardly for a short distance to terminate in a short vertical portion, the inner baffle portion and the outer casing being secured along the ridge line and the flue portion at the short vertical portions at the lower edges of the outer casing, rows of louvres disposed longitudinally on the base of the isosceles triangle and on the sloping walls of the flue portion, and rows of louvres formed in the top of the outer casing, the louvres on said top having their openings facing inwardly toward the longitudinal ridge line, whereby wind moving up the top will assist in the exhaust process, and the openings in the louvres in said triangle base facing downwardly and inwardly while those on the walls of the flue portion which slope downwardly from the base open downwardly, whereby rain, sleet or the like are prevented from entering the building while permitting air and gases from the building to pass therethrough.

7. A ridge ventilator for buildings having an elongated rectangular opening along the ridge, said ventilator being comprised of an outer casing an inner baffle and flue structure, and end closure caps, said baffle and flue structure extending the length of the ventilator, the baffle portions in cross section being in the form of an obtuse isosceles triangle having an opening in its horizontal base, the flue portion having outwardly sloping sections extending from the edges of said opening to the plane inwardly of the outer edges of the triangle, and thence outwardly on a lessor slope to a short vertical upright position and thence outwardly and downwardly to form flashing portions adapted to be secured to the pitch of the roof, the horizontal base of the triangle and the sloping portions of the flue portions which extend downwardly from the opening being formed with louvres therein, the openings of said louvres facing inwardly and downwardly respectively, the outer casing having a top sloping gently on each side of the center ridge line laterally to points beyond vertical planes passing through the side edges of the triangle, side walls of the outer casing sloping downwardly and outwardly from the vertical, thence inwardly for a short distance and terminating in narrow vertical portions which when the ventilator is assembled are spaced slightly from the short vertical upright portions of the baffle and support means to form a narrow drainage opening, rivet means securing the outer casing to the baffle and flue portions at points along said narrow vertical portions and at the apex of the isosceles triangle, and the top of the outer casing having rows of elongated louvres formed therein and disposed in rows parallel to the ridge line, the louvres in the top of the outer casing having their openings facing the ridge line of the ventilator.

* * * * *